(12) United States Patent
Shaw (10) Patent No.: US 8,162,089 B2
(45) Date of Patent: Apr. 24, 2012

(54) HUMAN POWERED AND ELECTRICITY BALANCED PERSONAL VEHICLE

(75) Inventor: De-In Shaw, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 51 days.

(21) Appl. No.: 12/873,444

(22) Filed: Sep. 1, 2010

(65) Prior Publication Data

US 2011/0221160 A1 Sep. 15, 2011

(30) Foreign Application Priority Data

Mar. 10, 2010 (TW) .............................. 99106969 A (51) Int. Cl.
*B60M 6/00* (2006.01)
(52) U.S. Cl. .................................................. 180/206.1
(58) Field of Classification Search .................. 180/210, 180/215, 216, 217, 205.1–209
See application file for complete search history.

(56) References Cited

U.S. PATENT DOCUMENTS

| | | | | |
|---|---|---|---|---|
| 3,598,195 A | * | 8/1971 | Steller | 180/206.1 |
| 3,827,519 A | * | 8/1974 | Snider | 180/206.1 |
| 3,941,075 A | * | 3/1976 | Rupenian | 440/12.62 |
| 4,111,274 A | * | 9/1978 | King et al. | 180/206.2 |
| 4,122,907 A | * | 10/1978 | Davidson et al. | 180/206.3 |
| 6,157,149 A | * | 12/2000 | Ohnuma | 318/139 |
| 6,158,542 A | * | 12/2000 | Nolet | 180/206.2 |
| 2004/0084238 A1 | * | 5/2004 | Yokotani et al. | 180/205 |
| 2005/0151224 A1 | * | 7/2005 | Abe | 257/510 |
| 2005/0173174 A1 | * | 8/2005 | Edmonds, Jr. | 180/206 |
| 2010/0314179 A1 | * | 12/2010 | Gibson | 180/2.2 |

* cited by examiner

*Primary Examiner* — Tony Winner (57) ABSTRACT

The present invention discloses a human powered and electricity balanced personal vehicle, which comprises: a main body for bearing a driver; a set of powered wheels being two coaxial wheels; a manpower inputting device being provided for the driver to input manpower into the personal vehicle; an electricity converting device for converting electricity to power and inputting the power into the personal vehicle; a transmission device for receiving the manpower inputted by the manpower inputting device and the power inputted by the electricity converting device, and inputting mixed power of the manpower and power into the powered wheels; an operation device being provided for the driver to control the moving state of the personal vehicle; a plurality of vehicle movement detecting devices for detecting the moving state of the personal vehicle and the operating condition of the driver; and a control unit for receiving and analyzing the signals of the plurality of vehicle movement detecting devices and controlling the electrical output of the electricity converting device.

9 Claims, 7 Drawing Sheets

HUMAN POWERED AND ELECTRICITY BALANCED PERSONAL VEHICLE

This application claims foreign priority from a Taiwan Patent Application, Ser. No. 099106969, filed on Mar. 10, 2010.

BACKGROUND OF THE INVENTION

1. Field of the Invention

The present invention relates to a personal vehicle, and more particularly to a personal vehicle which uses manpower as the major driving force for moving and uses electric motors for controlling the dynamic equilibrium.

2. Description of the Prior Art

Bicycles are general conveniences in early society. However, with the industrialization and the acceleration of the pace of life, the parts of functions of the bicycles are replaced by motorcycles and cars and thus the bicycles are gradually being ignored. In recent years, under the global wave of energy conservation and carbon reduction, the bicycles become one of the important selections for many commuters or people in exercise. Owing to the conventional bicycles are driven by manpower, all the problems caused by using fossil fuel, such as air pollution, consumption of too much energy and greenhouse gas emission, can be gotten rid of. Furthermore, the bicycles are simpler in structure, lighter in weight, easier to manufacture and maintenance and cheaper in cost than the other vehicles.

However, the size and the maneuverability of the bicycles are still need to be improved. Owing to the front-and-rare wheels installed in the bicycles make the body length longer, it is easy to interfere with pedestrians when driving the bicycles in the downtown, and the situation of battling between bicycles and pedestrians may happens.

Figure 1:
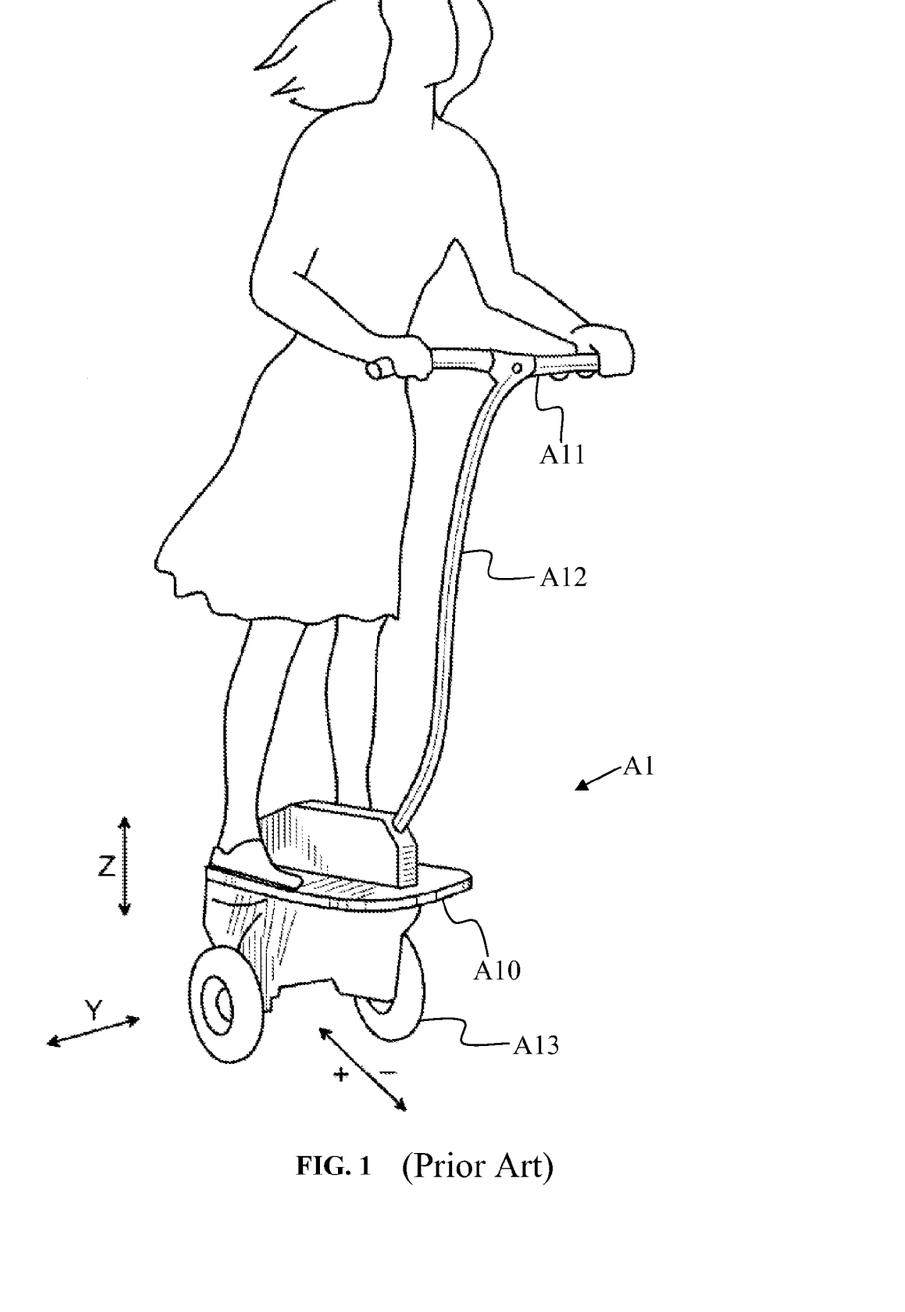
FIG. 1 is a perspective diagram of a balancing personal vehicle disclosed by U.S. Pat. Nos. 6,302,230 and 6,367,817.

In order to overcome the above shortcomings, a balancing personal vehicle is provided. Referring to FIG. 1, which is a perspective view of the balancing personal vehicle disclosed by U.S. Pat. Nos. 6,302,230 and 6,367,817. The balancing personal vehicle A1 includes a support platform A10, two grip A11, a handle A12, and two wheels A13. The internal of the support platform A10 is provided with an electronics component, such as several gyroscopes, for detecting the balance status of the vehicle body and a driver, and two motors are controlled by a control circuit for making the vehicle to balance itself. Thus, with the shift in the center of gravity of the driver, the vehicle can change the moving direction according to the center of gravity.

In 2001, a product of a motor-driven vehicle was launched according to the above patents and referred as "SEGWAY". SEGWAY is a balancing personal vehicle driven by electricity entirely, and the electricity source is a lithium battery. The electricity is converted to power and then output by the motor and the exhausted battery can be charged with a general socket. SEGWAY does not produce and discharge carbon dioxide, thus it can reduce much air pollution and the consumption of energy relative to the motorcycles and the cars.

On the other hand, SEGWAY occupies a space merely wider slightly than a person when standing, thus it can move on a general road, enter an elevator, and over stride a small difference of level. Owing to the two co-axis installed wheels, the parking space required by SEGWAY is smaller than that required by the bicycles and the motorcycles. When SEGWAY is moving, the two-wheel installation and the differential steering design make the actions more flexible and SEGWAY even can move backward due to the above features. The interference with pedestrians by SEGWAY is less than the motorcycles or the bicycles installed with the front-and-rare wheels, thus SEGWAY possesses more advantages than other kinds of vehicles in a city with limited space.

However, owing to that SEGWAY is driven by electricity entirely, the situation of battery exhausting when moving may happen, and it is inconvenient for the driver to charge or exchange the battery. Moreover, SEGWAY must consume electricity, thus it can not conserve energy like the traditional bicycles.

In view of this, it has to provide a novel personal vehicle possessing the advantage of energy conservation of the traditional bicycles and the driving flexibility of SEGWAY with two co-axis installed wheels, and a personal vehicle suitable for using in the city will be developed. The combination of the novel personal vehicle and public vehicles can provide more flexibility and convenience and reduce the interference with pedestrians in a downtown.

SUMMARY OF THE INVENTION

In view of the above shortcomings of the prior art, the inventor of the present invention resorted to past experience, imagination, and creativity, performed experiments and researches repeatedly, and eventually devised the present invention, a human powered and electricity balanced personal vehicle.

The major objective of the present invention is to provide the human powered and electricity balanced personal vehicle, which employs a design of two co-axis installed wheels and can save much occupying space compared to a bicycle so as to produce less interference with surrounding people or cars and require less parking space.

Another objective of the present invention is to provide the human powered and electricity balanced personal vehicle, owing to the manpower treading is the major driving source of the personal vehicle and electricity is merely auxiliary for balancing, thus the personal vehicle of the present invention can move continuously even if the battery is exhausted and it is no need to charge or exchange the battery.

Further objective of the present invention is to provide the human powered and electricity balanced personal vehicle, owing to manpower treading is the major driving source of the personal vehicle and electricity is merely auxiliary for balancing, thus the personal vehicle of the present invention can conserve more energy relative to SEGWAY.

Consequently, the present invention provides a human powered and electricity balanced personal vehicle comprising: a main body for bearing a driver; a set of powered wheels being connected with the main body and being two coaxial wheels; a manpower inputting device being connected with the main body and provided for the driver to input manpower into the personal vehicle; an electricity converting device being disposed in the main body, wherein the electricity converting device can convert electricity to power and input the power into the personal vehicle; a transmission device being disposed in the main body, wherein the transmission device can receive the manpower inputted by the manpower inputting device and the power inputted by the electricity converting device, and inputting mixed power of the manpower and the power into the powered wheels; an operation device being connected with the main body and provided for the driver to control a moving state of the personal vehicle; a plurality of vehicle movement detecting devices for detecting the moving status of the personal vehicle and an operating condition of the driver; and a control unit being disposed in the main body and connected with the plurality of vehicle movement detecting devices and the electricity converting device, wherein the control unit can receive and analyze the signals of the plurality of vehicle movement detecting devices and control the electrical output of the electricity converting device.

BRIEF DESCRIPTION OF THE DRAWINGS

For a complete understanding of the aspects, structures and techniques of the invention, reference should be made to the following detailed description and accompanying drawings wherein.

DETAILED DESCRIPTION OF THE PREFERRED EMBODIMENTS

To achieve the foregoing objectives and effects, the inventors employ manpower treading as the major driving source of the personal vehicle and electricity as auxiliary power for balancing, thus achieving a human powered and electricity balanced personal vehicle. Hereinafter, the human powered and electricity balanced personal vehicle according to a first preferred embodiment and a second preferred embodiment of the present invention will be described in detail for illustrating the structural features and principles of the present invention.

Figure 2:
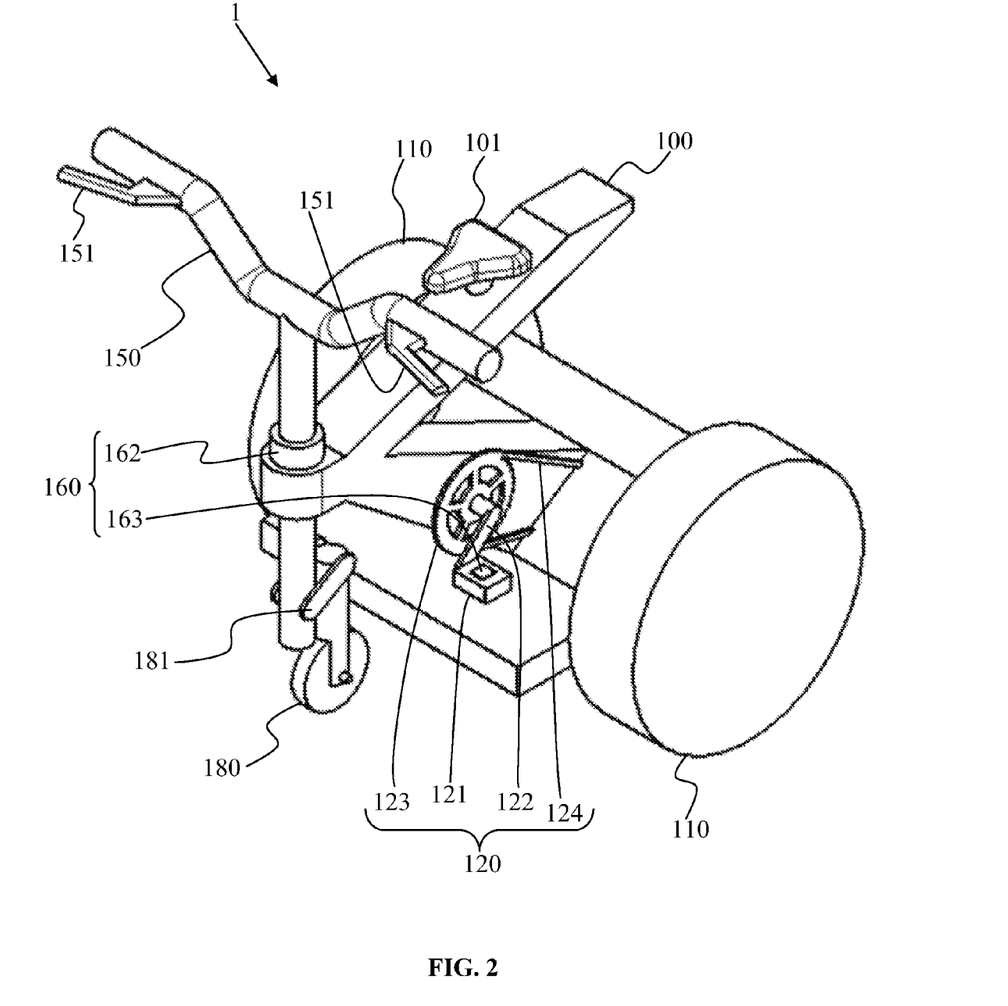
FIG. 2 is a perspective diagram of a human powered and electricity balanced personal vehicle according to a first preferred embodiment of the present invention.
Figure 3:
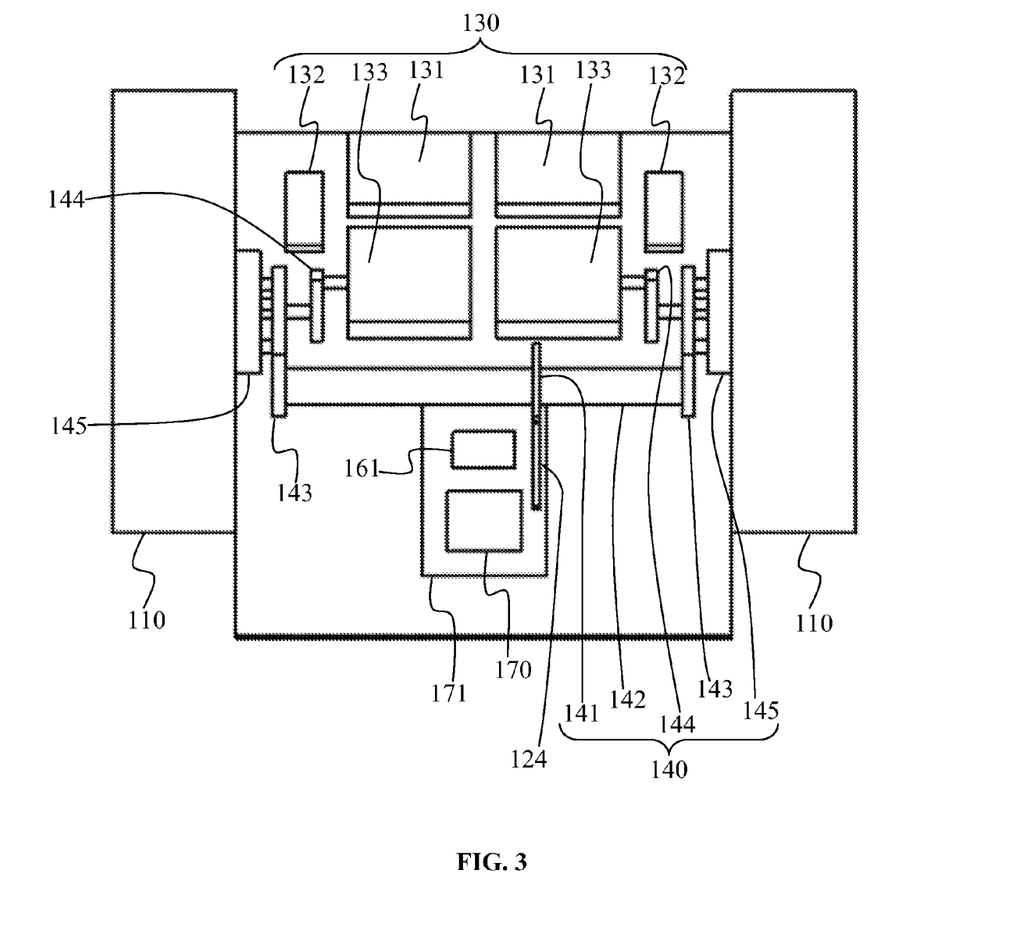
FIG. 3 is a vertical view of internal components of the human powered and electricity balanced personal vehicle according to the first preferred embodiment of the present invention.
Figure 4:
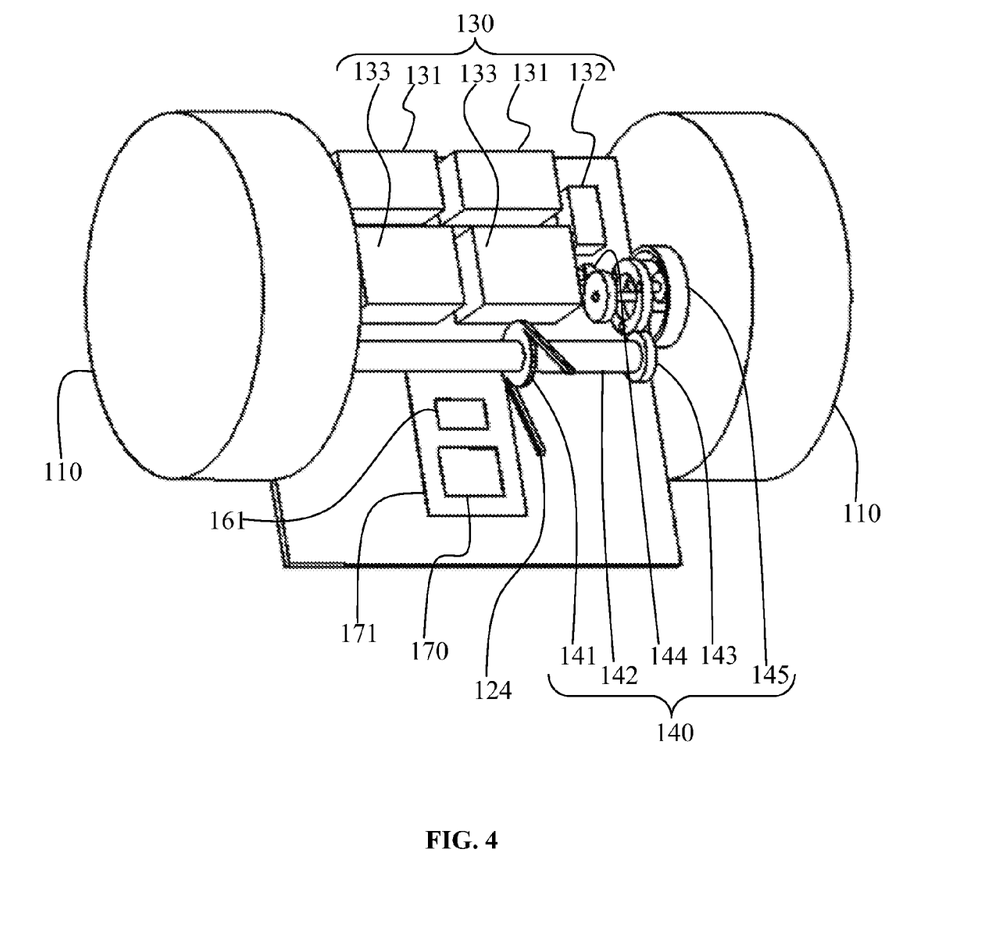
FIG. 4 is a perspective diagram of the internal components of the human powered and electricity balanced personal vehicle according to the first preferred embodiment of the present invention.

Referring to FIG. 2, FIG. 3 and FIG. 4, FIG. 2 is a perspective diagram of a human powered and electricity balanced personal vehicle according to a first preferred embodiment of the present invention, FIG. 3 is a vertical view of internal components of the human powered and electricity balanced personal vehicle according to the first preferred embodiment of the present invention, and FIG. 4 is a perspective diagram of the internal components of the human powered and electricity balanced personal vehicle according to the first preferred embodiment of the present invention. A personal vehicle 1 of the present invention includes a main body 100, a set of powered wheels 110, a manpower inputting device 120, a electricity converting device 130, a transmission device 140, an operation device 150, a plurality of vehicle movement detecting devices 160, a control unit 170, and an auxiliary wheel 180.

The main body 100 can carry a driver, and a seat 101 is disposed on the main body 100 for the driver to sit.

The set of powered wheels 110 are connected with the main body, and the set of powered wheels 110 are two coaxial wheels.

The manpower inputting device 120 is connected with the main body 100 and provided for the driver to input manpower into the personal vehicle 1. The manpower inputting device 120 includes two pedals 121, two cranks 122, a first fluted disc 123, and a roller chain 124. The two pedals 121 are provided for the driver to input manpower. The two cranks 122 are connected with the two pedals 121 respectively. The first fluted disc 123 is connected with the two cranks 122. The roller chain 124 is connected with the first fluted disc 123 and the transmission device 140.

The electricity converting device 130 is disposed in the main body 100, and the electricity converting device 130 can convert electricity to power and then input the power into the personal vehicle 1. The electricity converting device 130 comprises two batteries 131, two motor drivers 132 and two motors 133. The two motor drivers 132 are connected with the two batteries 131 respectively, wherein the two motor drivers 132 can start the charging function when receiving a braking signal. The two motors 133 are connected with the two motor drivers 132 and the transmission device 140, wherein the two motors 133 can be driven by the two motor drivers 132 and then transmit the power to the transmission device 140. In practice, it can achieve the same goal by employing one battery and one motor driver in the electricity converting device 130.

The transmission device 140 is disposed in the main body 100. The transmission device 140 can receive the manpower inputted by the manpower inputting device 120 and the power inputted by the electricity converting device 130, and then input mixed power of the manpower and the power into the powered wheels 110. The transmission device 140 comprises a second fluted disc 141, a transmission shaft 142, two first gear wheels 143, two second gear wheels 144, and two planetary gear sets 145. The second fluted disc 141 is connected with the roller chain 124 of the manpower inputting device 120. The transmission shaft 142 is connected with the second fluted disc 141. The two first gear wheels 143 are connected with the two ends of the transmission shaft 142 respectively. The two second gear wheels 144 are connected with the two motors 133 of the electricity converting device 130 respectively. The two planetary gear sets 145 are connected with the two first gear wheels 143, the two second gear wheels 144 and the two powered wheels 110 respectively, wherein the two planetary gear sets 145 can receive the manpower transmitted by the two first gear wheels 143 and the power transmitted by the two second gear wheels 144, and then output the mixture of the manpower and the power to each powered wheel 110 so as to make the powered wheels 110 move around.

The operation device 150 is connected with the main body 100 and provided for the driver to control a moving state of the personal vehicle 1. Two laterals of the operation device 150 are provided with a brake controlling element 151 for the driver to operate with two hands and control the brake function of the personal vehicle 1. The brake controlling element 151 can be a mechanical type or an electronic type.

The plurality of vehicle movement detecting devices 160 are provided for detecting the moving state of the personal vehicle and an operating condition of the driver. The plurality of vehicle movement detecting devices 160 comprises an electrical detecting element 161, an encoder 162 and two torsion detecting elements 163. The electrical detecting element 161 is a gyroscope and disposed in the main body 100, wherein the gyroscope can detect an angular magnitude, an angular velocity, a velocity, and an acceleration of the personal vehicle relative to the ground. The encoder 162 is disposed in the operation device 150 and provided for detecting an angular magnitude of the driver turning the operation device 150. The two torsion detecting elements 163 are disposed in the manpower inputting device 120 and provided for detecting a torsion input by the driver treading the two pedals 121. More details, the two torsion detecting elements 163 are disposed in the two pedals 121 respectively, and the two torsion detecting elements 163 can detect the torsion with a pressure detecting element. The torsion is equivalent to the cross product of the amount of input manpower detected by the pressure detecting element and the length of the crank 122. Besides, in practices, the electrical detecting element 161 further includes an inclinometer and an accelerometer.

The control unit 170 is disposed in the main body 100 and connected with the plurality of vehicle movement detecting devices 160 and the electricity converting device 130, wherein the control unit 170 can receive and analyze the signals of the plurality of vehicle movement detecting devices 160 and control the electrical output of the electricity converting device 130. The control unit 170 also can monitor the electric quantity and the charging/discharging status of the battery 131, and can manage the charging/discharging status of the battery 131 according to the road conditions and the driving status of the driver. Wherein the control unit 170 and the electrical detecting element 161 are integrated on a printed circuit board 171, and the printed circuit board 171 is disposed in the main body 100.

The auxiliary wheel 180 is connected with the operation device 150 through an auxiliary wheel operating mechanism 181. When using the electricity balancing function, the auxiliary wheel 180 and the auxiliary wheel operating mechanism 181 are in the hidden status without contacting with the ground.

In the first preferred embodiment of the present invention, the personal vehicle 1 further contains a power switch (not shown in the figures), which is disposed on the operation device 150 and provided for the driver to switch the power. That is, the driver can selectively decide to turn on the electricity balancing function or not.

Figure 5:
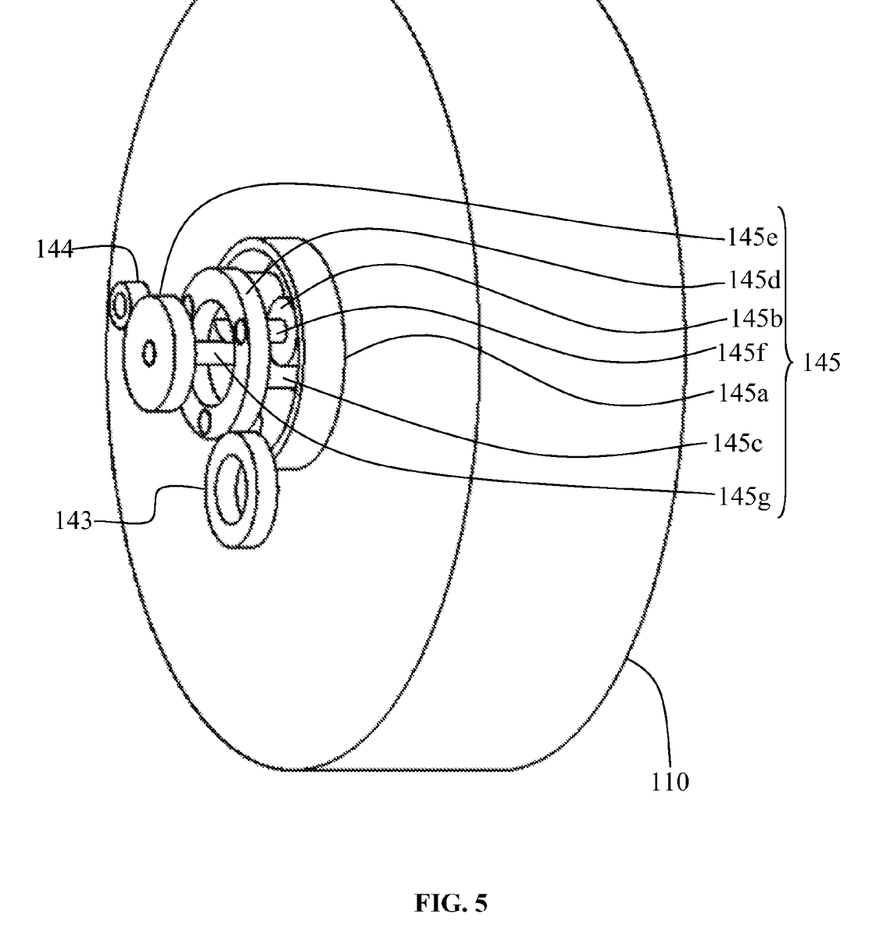
FIG. 5 is a schematic diagram of a planetary gear set and a powered wheel of the human powered and electricity balanced personal vehicle according to the first preferred embodiment of the present invention.

Referring to FIG. 5, a schematic diagram of one planetary gear set and one powered wheel of the human powered and electricity balanced personal vehicle according to the first preferred embodiment of the present invention is illustrated. The planetary gear set 145 includes a planetary ring gear 145a, a planetary gear 145b, a sun gear 145c, a planetary arm gear 145d, an accessory gear 145e coaxial with the sun gear 145c, a first short shaft 145f connected with the planetary gear 145b and the planetary arm gear 145d, and a second short shaft 145g connected with the sun gear 145c and the accessory gear 145e. The manpower input by the driver is transmitted into the planetary arm gear 145d from the first gear wheel 143, and then transmitted into the planetary gear 145b through the first short shaft 145f. The power provided by the motor 133 is transmitted into the accessory gear 145e from the second gear wheel 144, and then transmitted into the sun gear 145c through the second short shaft 145g. According to the principle of Planetary Gear System, the manpower input by the driver and the power input by the motor 133 will be hybridized in accordance with the ratio of teeth number between the planetary gear 145b, the sun gear 145c and the planetary ring gear 145a, and then the hybridized power is output to the powered wheel 110 from the planetary ring gear 145a so as to make the powered wheel 110 move around. If there is no planetary gear system with suitable ratio of teeth number, a proper ratio of hybridized power can be obtained by adjusting the dimension of the first gear wheel 143 and the second gear wheel 144. In the first preferred embodiment of the present invention, the major function of the planetary gear system is to hybridize the power, and the second function is to adjust the ratio of output power.

Figure 6:
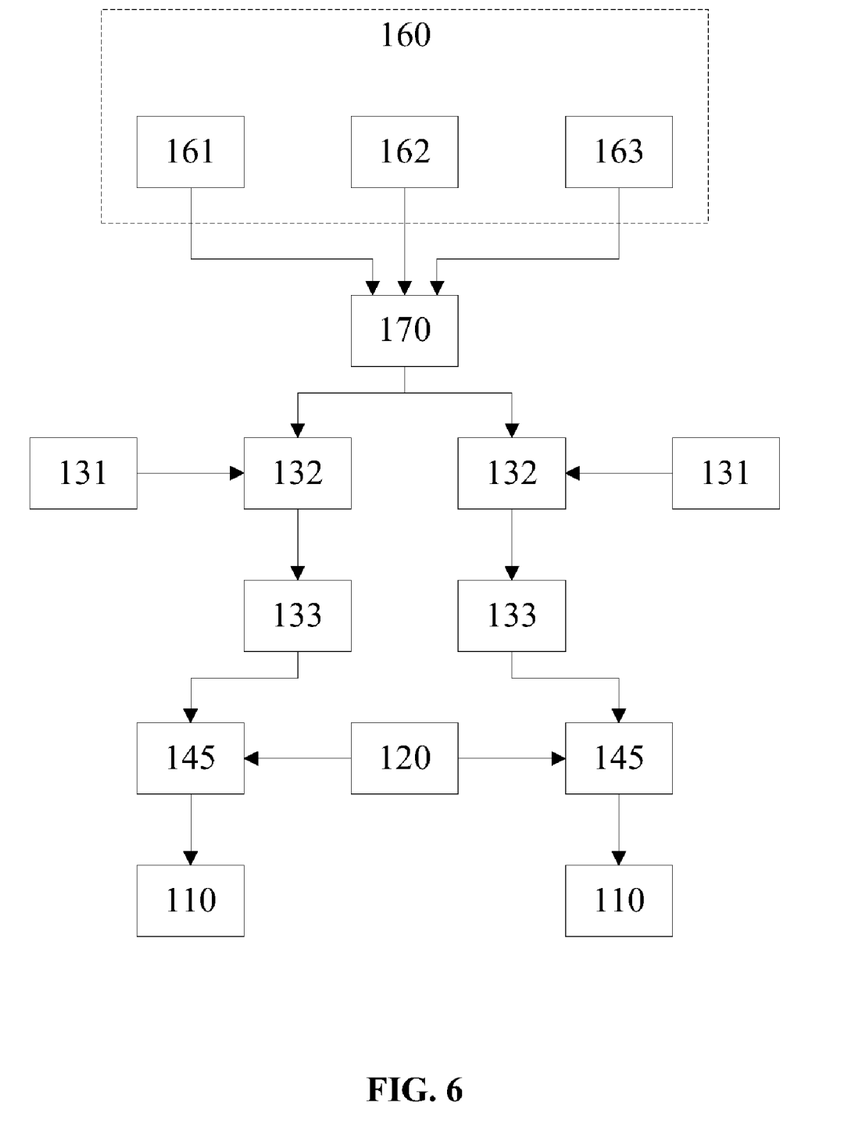
FIG. 6 is a schematic diagram of the signal, power and energy transmission and the relationship of controlling between the major components of the human powered and electricity balanced personal vehicle according to the first preferred embodiment of the present invention.

Referring to FIG. 6, a schematic diagram of the signal, power and energy transmission and the relationship of controlling between the major components of the human powered and electricity balanced personal vehicle according to the first preferred embodiment of the present invention is illustrated. Above all, when the personal vehicle 1 moves, the plurality of vehicle movement detecting devices 160 detects the moving state of the personal vehicle 1 and the operating condition of the driver continuously. The moving state of the personal vehicle 1 and the operating condition of the driver include the following information: the angular magnitude, the angular velocity, the velocity, and the acceleration of the personal vehicle relative to the ground being detected by the electrical detecting element 161 such as the gyroscope; the torsion being input by the driver and detected by the torsion detecting element 163; and angular magnitude of the driver turning the operation device 150 being detected by the encoder 162. Next, the above detected data are transmitted to the control unit 170. The control unit 170 further calculates the moment of force need to be output by the two motors 133, and then indicates the two motor drivers 132 to control the two motors 133 for outputting the specific moment of force, finally the power is output to the two planetary gear sets 145. For example, if the value detected by the encoder 162 is not equal to zero, the two motors 133 will output differential power and make the personal vehicle 1 turn around. The two batteries 131 provide electricity to the two motor drivers 132 respectively. Besides, the driver can operate the manpower inputting device 120 and input the manpower into the two planetary gear sets 145. After the power of the motors 133 and the manpower are hybridized in the two planetary gear sets 145, the hybridized power is output to the two powered wheels 110 and the personal vehicle 1 can move according to the particular direction and speed.

Owing to the personal vehicle 1 of the first preferred embodiment according to the present invention has the feature of two co-axis installed wheels, the integral of the personal vehicle 1 and the driver can be regarded as an inverted simple pendulum system. The electrical detecting element 161, such as a gyroscope, can detect the balance (or inclined) status of the personal vehicle 1 and the driver in the movement state, such as the angular magnitude, the angular velocity, the velocity, and the acceleration relative to the ground. After calculating the above physical quantities by the control unit 170, proper signals are sent out to the two motors 133, and then the two motors 133 can convert the electricity of the batteries 131 to the power and output the power to the two co-axis installed wheels independently so as to balance the integral of the personal vehicle 1 and the driver.

Figure 7:
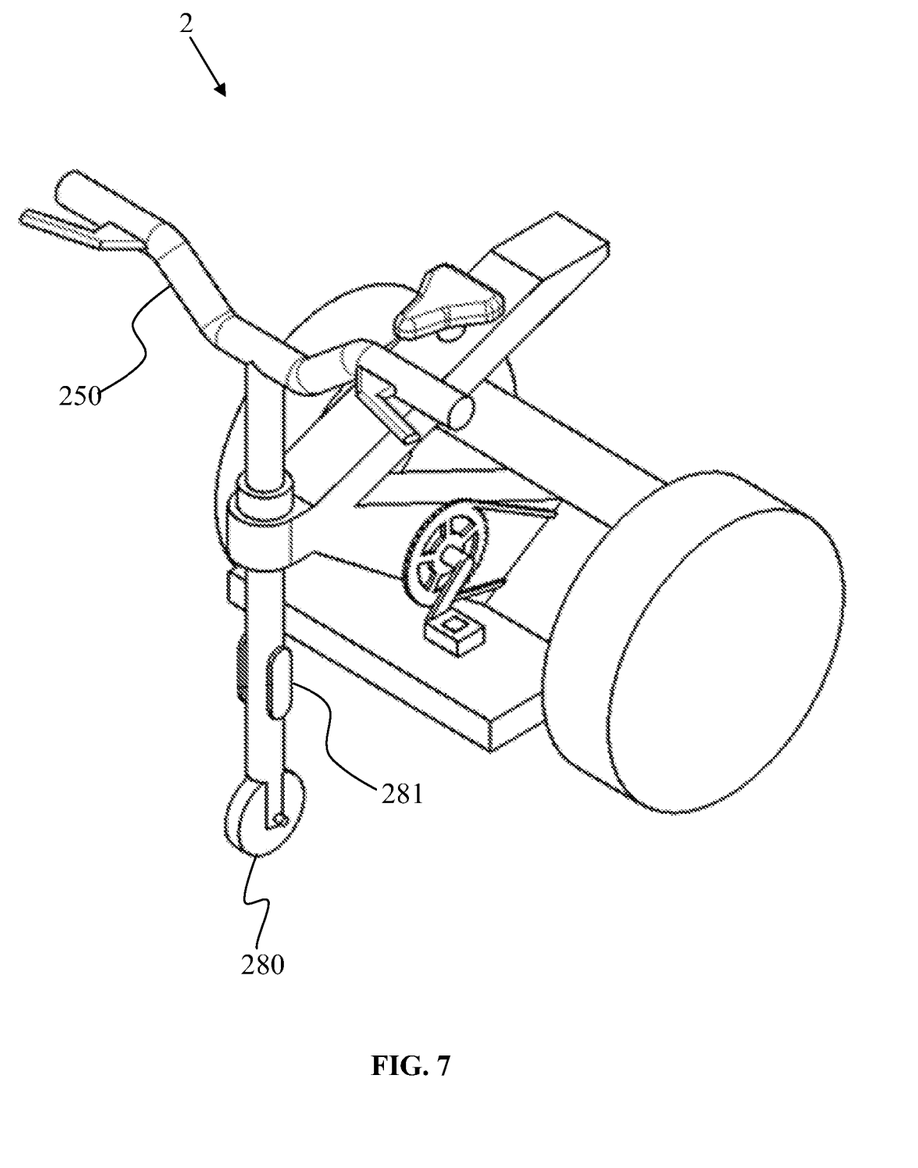
FIG. 7 is a perspective diagram of the human powered and electricity balanced personal vehicle according to a second preferred embodiment of the present invention.

Referring to FIG. 7, a perspective diagram of the human powered and electricity balanced personal vehicle according to the second preferred embodiment of the present invention is illustrated. Owing to the components and the structure of the second preferred embodiment are in common with those of the first preferred embodiment, the details of these previously described comments are omitted herein. The difference is that an auxiliary wheel 280 of the personal vehicle 2 of the second preferred embodiment contacts with the ground, that is, the personal vehicle 2 moves with three wheels. This way can be used when the batteries are all exhausted, and the driver can control the rotation direction of the auxiliary wheel 280 by operating an operation device 250, therefore the auxiliary wheel 280 plays the roles of a supporting wheel and a turning wheel at the same time. Furthermore, when a bad road condition or an impact of an improper external force makes the obliquity of the personal vehicle 2 is too much, and even if the batteries are not exhausted, the auxiliary wheel 280 can be extended to contact with the ground for providing additional support to the personal vehicle without falling down.

In the forgoing first and second preferred embodiments, the manpower is the major driving force and the electricity is provided for assisting the balance in the normal driving, and the batteries keep in the discharge status and provide power for the motors. When the speed of the personal vehicle is too high or the personal vehicle is driven in a downgrade, stopping the personal vehicle by operating the brake controlling element can retrieve some energy for charging the batteries by the motors. In addition, the personal vehicle of the present invention can be raised, and then the motors and the batteries can be charged by treading on the pedals. The personal vehicle not only has the advantage of energy conservation but also can be used as an interior healthy body vehicle.

Moreover, the human powered and electricity balanced personal vehicle of the present invention can be ride purely by man power when the rider want to do so.

By the detailed description of the overall structure and technical content of the present invention, the following advantages of the present invention can be derived:

The present invention employs a design of two co-axis installed wheels and can save much occupying space compared to a bicycle so as to produce less interference with surrounding people or cars and require less parking space.

Owing to the manpower treading is the major driving source of the personal vehicle and electricity is merely auxiliary for balancing, thus the personal vehicle of the present invention can move continuously even if the battery is exhausted and it is no need to charge or exchange the battery.

Owing to manpower treading is the major driving source of the personal vehicle and electricity is merely auxiliary for balancing, thus the personal vehicle of the present invention can conserve more energy relative to SEGWAY.

The personal vehicle of the present invention can retrieve some energy for charging the batteries when braking the personal vehicle or driving in a downgrade, it can also be raised and trod for charging the batteries, and thus the personal vehicle has the advantage of energy conservation.

It should be understood that the embodiments of the present invention described herein are merely illustrative of the technical concepts and features of the present invention and are not meant to limit the scope of the invention. Those skilled in the art, after reading the present disclosure, will know how to practice the invention. Various variations or modifications can be made without departing from the spirit of the invention. All such equivalent variations and modifications are intended to be included within the scope of the invention.

As a result of continued thinking about the invention and modifications, the inventors finally work out the designs of the present invention that has many advantages as described above. The present invention meets the requirements for an invention patent, and the application for a patent is duly filed accordingly. It is expected that the invention could be examined at an early date and granted so as to protect the rights of the inventors.

What is claimed is:

1. A human powered and electricity balanced personal vehicle comprising:
   a main body for bearing a driver;
   a set of powered wheels being connected with the main body and being two coaxial wheels;
   a manpower inputting device being connected with the main body and provided for a driver to input a manpower into the personal vehicle;
   an electricity converting device being disposed in the main body, wherein the electricity converting device can convert electricity to a motorized power and input the motorized power into the personal vehicle;
   a transmission device being disposed in the main body, wherein the transmission device can receive mixed input power from the manpower and the motorized power to the powered wheels;
   an operation device being connected with the main body and provided for the driver to control a moving state of the personal vehicle;
   a plurality of vehicle movement detecting devices detecting the moving state of the personal vehicle and an operating condition of the driver; and
   a control unit being disposed in the main body and connected with the plurality of vehicle movement detecting devices and the electricity converting device, wherein the control unit can receive and analyze the signals of the plurality of vehicle movement detecting devices and control an electrical output of the electricity converting device.

2. The human powered and electricity balanced personal vehicle according to claim 1, further comprising an auxiliary wheel which is connected with the operation device through an auxiliary wheel operating mechanism.

3. The human powered and electricity balanced personal vehicle according to claim 1, wherein the manpower inputting device comprises:
   at least one pedal for the driver to input manpower;
   at least one crank being connected with the pedal;
   a fluted disc being connected with the crank; and
   a roller chain being connected with the first fluted disc and the transmission device.

4. The human powered and electricity balanced personal vehicle according to claim 1, wherein the electricity converting device comprises:
   at least one battery;
   at least one motor driver being connected with the battery, wherein the motor driver can start a charging function when receiving a braking signal; and
   at least one motor being connected with the motor driver and the transmission device, wherein the motor can be driven by the motor driver and transmit the power to the transmission device.

5. The human powered and electricity balanced personal vehicle according to claim 1, wherein the operation device is provided with a brake controlling element.

6. The human powered and electricity balanced personal vehicle according to claim 1, wherein the plurality of vehicle movement detecting devices comprises:
   at least one electrical detecting element being a gyroscope and disposed in the main body, wherein the gyroscope can detect an angular magnitude, an angular velocity, a velocity, and an acceleration of the personal vehicle relative to the ground;
   an encoder being disposed in the operation device and for detecting an angular magnitude of the driver turning the operation device; and
   at least one torsion detecting element being disposed in the manpower inputting device and for detecting a torsion input by the driver.

7. The human powered and electricity balanced personal vehicle according to claim 1, wherein the transmission device comprises:

a fluted disc being connected with the manpower inputting device;

a transmission shaft being connected with the second fluted disc;

two first gear wheels being connected with the two ends of the transmission shaft respectively;

two second gear wheels being connected with the electricity converting device respectively; and two planetary gear sets being connected with the two first gear wheels, the two second gear wheels and the two powered wheels respectively, wherein the two planetary gear sets can receive the manpower transmitted by the two first gear wheels and the power transmitted by the two second gear wheels, and outputting the mixture of the manpower and the power to each powered wheel.

8. The human powered and electricity balanced personal vehicle according to claim 1, further comprising a power switch being disposed on the operation device for switching between the manpower and motorized power.

9. The human powered and electricity balanced personal vehicle according to claim 1, wherein the vehicle may be ridden by manpower alone.

* * * * *